(12) United States Patent
Matsumoto

(10) Patent No.: US 7,763,106 B2
(45) Date of Patent: Jul. 27, 2010

(54) INK SET FOR INKJET RECORDING AND IMAGE RECORDING METHOD

(75) Inventor: Jun Matsumoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/379,093

(22) Filed: Feb. 12, 2009

(65) Prior Publication Data

US 2009/0208653 A1 Aug. 20, 2009

(30) Foreign Application Priority Data

Feb. 15, 2008 (JP) .............................. 2008-034583

(51) Int. Cl.
*C09D 11/02* (2006.01)

(52) U.S. Cl. .................................................. 106/31.6

(58) Field of Classification Search .................. 106/31.6
See application file for complete search history.

(56) References Cited

U.S. PATENT DOCUMENTS

| 6,074,467 A * | 6/2000 | Tabayashi et al. ........ 106/31.65 |
| 6,214,099 B1 * | 4/2001 | Ueda et al. ............... 106/31.57 |
| 6,821,328 B2 * | 11/2004 | Tomioka et al. .......... 106/31.33 |
| 2007/0054981 A1 * | 3/2007 | Yanagi et al. ................ 523/160 |

FOREIGN PATENT DOCUMENTS

| JP | 2007-119586 | 5/2007 |
| JP | 2007-261206 | 10/2007 |

* cited by examiner

*Primary Examiner*—Jerry Lorengo
*Assistant Examiner*—Veronica Faison Gee
(74) *Attorney, Agent, or Firm*—Jean C. Edwards, Esq.; Akerman Senterfitt

(57) ABSTRACT

The present invention provides an ink set for inkjet recording which has excellent resistance to light and can prevent image blurring and image deformation due to cracks or the like, wherein the ink set includes: a first liquid including a water soluble organic solvent, water and a pigment dispersed therein, in which an average particle diameter of the pigment is from 5 nm to 50 nm and a monodispersity of the pigment is 1.5 or less; and a second liquid which includes a component that can reduce a pH of the first liquid to less than 7 when contacted with the first liquid and can transform the first liquid from a region in which the dispersion of the pigment particles is stable to a region in which the dispersion of the pigment particles is unstable. The invention also provides a method of image recording using the ink set for inkjet recording.

13 Claims, No Drawings

INK SET FOR INKJET RECORDING AND IMAGE RECORDING METHOD

CROSS-REFERENCE TO RELATED APPLICATION

This application claims priority under 35 USC 119 from Japanese Patent Application No. 2008-034583, filed Feb. 15, 2008, the disclosure of which is incorporated by reference herein.

BACKGROUND OF THE INVENTION

1. Technical Field

The present invention relates to a two-liquid coagulation type ink set for inkjet recording and a method of image recording using the same.

2. Background Art

As a medium for inkjet recording, various recording media have been studied. A technology which enables the achievement of high quality images even with commercially available plain paper has been required. In addition, for ink as well, studies have been carried out regarding color materials like a pigment, etc. as an ink material which can be used for obtaining resistance to water and light.

However, when recording is carried out by using plain paper, sometimes there are cases in which blurring is too great to obtain image density and fixing property at a sufficient level. In particular, the demand for achieving high speed is great in inkjet recording, and therefore, suitability for recording is required in the case where high speed recording is performed in a single pass manner, by which recording can be carried out with a single operation of a head, rather than in a shuttle scanning manner.

When images are formed on various recording media, as a way of obtaining a high fixing property, broadening of a range for reproducing secondary colors, maintenance of optical density during high speed printing and prevention of blurring, a method of using two kinds of liquids comprising a first liquid containing pigment particles and a second liquid containing a liquid composition for improving printability has been suggested (for example, see Japanese Patent Application Laid-Open (JP-A) No. 2007-261206). According to this method, it is suggested that the above described goals can be achieved by reducing the particle diameter of the pigment included in the first liquid, specifically, by reducing the content ratio of coarse particles which have a diameter of 150 nm or more.

In addition, there is also disclosure of a method of producing a liquid composition, wherein polymer pigment fine particles having a small average particle diameter and high size uniformity are contained in a dispersed state (for example, see JP-A No. 2007-119586). According to this disclosure, a method of recording by using a first liquid is mainly described, and with respect to a process for fixing an image by using a second liquid which is different from the colored liquid composition, a method using a polyvalent cation is described.

SUMMARY OF THE INVENTION

The present invention aims to solve the above-described prior art problems, and achieves the following. More specifically, the invention according to an aspect of the invention provides an ink set for inkjet recording comprising, a first liquid which contains a water soluble organic solvent, water and a pigment dispersed therein, in which an average particle diameter of the pigment is from 5 nm to 50 nm and a monodispersity of the pigment is 1.5 or less, and a second liquid which contains a component that can reduce a pH of the first liquid to less than 7 when contacted with the first liquid and can transform the first liquid from a region in which the dispersion of the pigment particles is stable to a region in which the dispersion of the pigment particles is unstable; and a method of image recording using the ink set.

DETAILED DESCRIPTION

According to the method described in JP-A No. 2007-119586, in which two kinds of liquids, i.e., first liquid and second liquid, are used, however, there is a problem in that image blurring, image deformation due to crack or the like caused by drying, etc. and reduction in resistance to light occur especially in the case where the recent requirement of having increased speed for inkjet recording needs to be satisfied.

In addition, according to the above described conventional method of producing a liquid composition, an effect of improving image blurring and image deformation is not obtained at the desired level.

This invention, which is devised in view of the above described aspects, has a purpose of providing an ink set for inkjet recording which has high resistance to light and is useful for preventing image blurring and image deformation due to crack, etc. and a method of image recording using the same, and the subject of the invention is to achieve the purpose.

The invention is based on the findings that, in a system in which pigment paricles included in colored aqueous ink in a dispersed state have a small average diameter and monodispersity within a certain range, by using a liquid which can change a pH to be on the acidic side, image blurring and image deformation can be prevented and also resistance to light can be improved. As a result of such findings, the invention was completed.

The inventors found, after studying hard the problems, that the objects to solve the problems may be achieved by items <1> to <12> shown below.

<1> An ink set for inkjet recording comprising, a first liquid which contains a water soluble organic solvent, water and a pigment dispersed therein, in which an average particle diameter of the pigment is from 5 nm to 50 nm and a monodispersity of the pigment is 1.5 or less, and a second liquid which contains a component that can reduce a pH of the first liquid to less than 7 when contacted with the first liquid and can transform the first liquid from a region in which the dispersion of the pigment particles is stable to a region in which the dispersion of the pigment particles is unstable.

<2> The ink set for inkjet recording of item <1>, wherein the first liquid further contains a dispersing agent.

<3> The ink set for inkjet recording of item <2>, wherein the dispersing agent has a weight average molecular weight in the range of from 2,000 to 60,000 and an addition ratio of the dispersing agent with respect to the pigment is in the range of from 10% by mass to 100% by mass.

<4> The ink set for inkjet recording of any one of items <1> to <3>, wherein the pigment is produced by a build up method.

<5> The ink set for inkjet recording of any one of items <1> to <4>, wherein the pigment is an encapsulated pigment.

<6> The ink set for inkjet recording of any one of items <1> to <5>, wherein the first liquid has a pH of 7.5 or more and the second liquid has a pH of 5 or less.

<7> The ink set for inkjet recording of any one of items <1> to <6>, wherein at least one of the first liquid is a magenta hue liquid containing a magenta hue pigment as the pigment, and the first liquid further comprises a black hue liquid containing a black hue pigment which has an average particle diameter that is at least 30 nm larger than that of the magenta hue pigment.

<8> The ink set for inkjet recording of any one of items <1> to <6>, wherein at least one of the first liquid is a cyan hue liquid containing a cyan hue pigment as the pigment, and the first liquid further comprises a black hue liquid containing a black hue pigment which has an average particle diameter that is at least 30 nm larger than that of the cyan hue pigment.

<9> The ink set for inkjet recording of any one of items <1> to <6>, wherein at least one of the first liquid is a yellow hue liquid containing a yellow hue pigment as the pigment, and the first liquid further comprises a black hue liquid containing a black hue pigment which has an average particle diameter that is at least 30 nm larger than that of the yellow hue pigment.

<10> The ink set for inkjet recording of any one of items <1> to <6>, wherein at least a black hue liquid, a cyan hue liquid, a magenta hue liquid and a yellow hue liquid are comprised as the first liquid.

<11> A method of image recording using the ink set for inkjet recording of any one of items <1> to <10>.

<12> The method of image recording of item <11>, comprising discharging the first liquid and discharging the second liquid.

<13> The method of recording an image of item <12>, comprising discharging the first liquid after discharging the second liquid.

Herein below, the ink set for inkjet recording and a method of image recording using the same according to the exemplary embodiment of the invention are explained in detail.

<Ink Set for Inkjet Recording>

Ink set for inkjet recording of the exemplary embodiment of the invention comprises a first liquid which contains a water soluble organic solvent, water and a pigment, and a second liquid which can transform the first liquid from a region in which the dispersion of the pigment particles is stable to a region in which the dispersion of the pigment particles is unstable, and it can create an image based on coagulation that occurs when the first liquid and second liquid are brought into contact with each other. The ink set for inkjet recording of the invention may comprise one of the first liquid and one of the second liquid, or may comprise multiple types of at least one of the two liquids.

(First Liquid)

The first liquid included in the ink set for inkjet recording of the invention (herein below, sometimes referred to as an "ink composition") comprises a water soluble organic solvent, water and a pigment dispersed therein, and it is based on the constitution that the average particle diameter of the pigment is in the range of from 5 nm to 50 nm and the monodispersity is 1.5 or less. The ink composition of the invention can include, depending on necessity, other components including a resin polymer, a polymer latex, a surfactant and the like.

According to the invention, by having the average particle diameter of the pigment particles, that are included in the ink composition in a dispersed state, in the small diameter range of from 5 nm to 50 nm and the monodispersity of the pigment particles in a uniform-diameter region of 1.5 or less, in the case where an image is recorded by changing a pH to be on the acidic side with the action of second liquid as described below, image blurring is inhibited, image deformation due to crack or the like which can easily occur by solvent evaporation, etc. is inhibited, and at the same time resistance to light of the image is improved. As a result, high speed inkjet recording can be achieved so that an image having an excellent image quality and light fastness can be recorded at a high speed, for example, in a single pass manner.

Now, average particle diameter and monodispersity of a pigment will be explained.

—Average Particle Diameter—

Average particle diameter of a pigment indicates a volume average particle diameter (Mv), and is measured by a dynamic light scattering method using Microtrac particle size analyzer (Version 10.1.2-211BH (trade name), manufactured by Nikkiso Co., Ltd.). Specifically, dispersion state of a pigment is evaluated by a dynamic light scattering method, and then from the obtained results, average particle diameter can be calculated. The principle therefor is as follows.

A pigment particle having particle diameter in the range of from about 1 nm to about 5 μm continuously changes its position and direction in a liquid due to Brownian motion such as vibration and rotation. Thus, when a laser beam is irradiated on such pigment particle and light scattered therefrom is measured, fluctuation in strength of scattered light which depends on Brownian motion can be observed. By following such fluctuation in strength of scattered light with time, a speed for Brownian motion of the particle (i.e., diffusion coefficient) can be obtained, and further the size of the particle can be determined.

According to the invention, the volume average particle diameter of the pigment comprised in the first liquid (i.e., an ink composition) is 50 nm or less, preferably 30 nm or less, and more preferably 20 nm or less. In the case where Mv is more than 50 nm, image blurring and image deformation cannot be prevented. In addition, since it is often difficult to stably produce particles with an ultrafine size, it is preferable to have particles having a size of 5 nm or more.

—Monodispersity—

Monodispersity serves as an indicator for evaluating monodispersibility of a dispersion and it is represented by the ratio (Mv/Mn) of volume average particle diameter (Mv) to number average particle diameter (Mn), that are obtained by a dynamic light scattering method. Volume average particle diameter (Mv) and number average particle diameter (Mn) are measured by a dynamic light scattering method using Microtrac size analyzer (Version 10.1.2-211BH (trade name), manufactured by Nikkiso Co., Ltd.).

With respect to the monodispersity of the pigment comprised in the first liquid of the invention (i.e., an ink composition), Mv/Mn of the pigment particles is 1.5 or less, and preferably 1.3 or less. In the case where Mv/Mn is more than 1.5, image blurring and image deformation cannot be prevented.

In the invention, the adjustment of the average particle diameter and the monodispersity of the pigment can be carried out by controlling a temperature or a speed for dispersing a pigment according to a method of preparing a pigment described below, i.e., controlling a speed for bringing a solution in which an organic pigment is dissolved into contact with an aqueous medium (for example, an injection speed for injecting one of a liquid to the other of a liquid), the addition ratio of a dispersing agent, pH control of an aqueous medium and the like.

The first liquid of the invention is preferably water-based ink. More preferably, a water dispersible pigment can be comprised as a colorant. Herein below, each component which constitutes the first liquid will be described in detail.

—Pigment—

The first liquid of the invention comprises as a colorant at least one pigment in a dispersed state. As for the pigment, any pigment which can form an image by coloring can be appropriately selected. According to the invention, from the view point of having it in a dispersed state to maintain uniformity, a water dispersible pigment is preferred. In addition, within the range that the effect of the invention is preserved, a dye or other colored fine particles can be comprised in addition to the pigment.

Specific examples of the water dispersible pigment include the pigments (1) to (4) that are described in the following.

(1) Encapsulated pigment, i.e., a polymer emulsion which is constituted by having a pigment in polymer particles. More specifically, a pigment is coated with a water insoluble hydrophilic resin to hydrophilize the surface of the pigment by a resin layer so that the pigment can be dispersed in water.

(2) Self dispersing pigment, i.e., a pigment which comprises at least one hydrophilic group on the surface and shows at least one of water dispersibility or water solubility in the absence of a dispersing agent. More specifically, carbon black etc. is hydrophilized by a surface oxidation treatment and the single material of the pigment is allowed to be dispersed in water.

(3) Resin dispersion pigment, i.e., a pigment which is dispersed by a water soluble polymer having a weight average molecular weight of 50,000 or less.

(4) Surfactant dispersion pigment, i.e., a pigment which is dispersed by a surfactant.

Among the above described pigments, (1) encapsulated pigment and (2) self dispersing pigment are preferred. More preferred is (1) encapsulated pigment.

The pigment for use in the pigment particle of the invention is not particularly limited, and examples thereof may include, organic pigments and inorganic pigments. The pigment may be appropriately selected depending on the purpose.

The organic pigment may include, for example, an azo pigment, a polycyclic pigment, a chelate dye, a nitro pigment, a nitroso pigment, and an aniline black. Among these, an azo pigment, a polycyclic pigment and the like are preferable in the invention.

The azo pigment may include, for example, an azo lake pigment, an insoluble azo pigment, a condensed azo pigment, and a chelate azo pigment.

The polycyclic pigment includes, for example, a phthalocyanine pigment, a perylene pigment, a perynone pigment, an anthraquinone pigment, a quinacridone pigment, a dioxazine pigment, a indigo pigment, a thioindigo pigment, an isoindolinone pigment, and a quinophthalone pigment. The chelate dye may include, for example, a basic dye-based chelate, and an acidic dye-based chelate.

As for yellow ink pigments of the organic pigments, the pigment may be C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, or the like. Among them, Pigment Yellow 74 is particularly preferable.

As for magenta ink pigments, the pigment may be C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101(red ocher rouge), 104, 105, 106, 108(cadmium red), 112, 114, 122(quinacridone magenta), 123, 146, 149, 163, 166, 168, 170, 172, 177, 178, 179, 184, 185, 190, 193, 202, 209, 219, 269, C.I. Pigment Violet 19 or the like. Among them, C.I. Pigment Red 122 is particularly preferable.

As for cyan ink pigments, the pigment may be C.I. Pigment Blue 1, 2, 3, 15, 15:1, 15:2, 15:3, 15:34, 16, 17:1, 22, 25, 56, 60, C.I. Pigment Vat Blue 4, 60, 63, or the like. Among them, C.I. Pigment Blue 15:3 is particularly preferable.

As for an inorganic pigment, examples include titanium oxide, iron oxide, calcium carbonate, barium sulfate, aluminum hydroxide, barium yellow, cadmium red, chrome yellow, carbon black and the like. Among these, carbon black is particularly preferred. Further, as for the carbon black, examples include those produced by a publicly known method such as a contact method, a furnace method, and a thermal method.

As for black ink pigments, examples of the carbon black may include Raven 7000, Raven 5750, Raven 5250, Raven 5000 ULTRAII, Raven 3500, Raven 2000, Raven1500, Raven 1250, Raven 1200, Raven 1190 ULTRAII, Raven 1170, Raven 1255, Raven 1080, Raven 1060, Raven 700 (all manufactured by Columbia Carbon CO., LTD.), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2v, Color Black 18, Color Black FW200, Color Black S150, Color Black S160 Color Black S170, Printex 35, Printex U, Printex V, Printex 140U, Printex 140V, Special Black 6, Special Black 5, Special Black 4A, Special Black 4 (all manufactured by Degussa AG.), No. 25, No. 33, No. 40, No. 45, No. 47, No. 52, No. 900, No. 2200B, No. 2300, MCF-88, MA600, MA7, MA8, MA100 (all manufactured by Mitsubishi Chemical CO., LTD.). However, the carbon black is not limited to those above in the invention.

The pigment can be used alone (i.e., only a single type) or in a combination of plural types that are selected from the same group or different groups described in the above.

—Method of Producing Pigment—

The pigment that is dispersed and comprised in the first liquid can be preferably obtained by a method in which an organic pigment is precipitated by bringing a solution comprising the organic pigment dissolved therein in contact with an aqueous medium (herein after, referred to as a "build up method"). In the case where an organic pigment is to get precipitated, a dispersing agent is contained in at least one of a solution comprising the organic pigment dissolved therein or an aqueous medium. For example, a solution in which an organic pigment is dissolved in a favorable solvent (i.e., a solvent which can dissolve a pigment; e.g., an aprotic polar organic solvent including dimethyl sulfoxides and the like) is injected to a poor solvent (i.e., an aqueous solvent which cannot dissolve a pigment; e.g., water and the like) comprising a dispersing agent via a nozzle at a certain speed (e.g., high speed) to continuously precipitate fine particles, thus eventually obtaining pigment particles. According to this method, the surfaces of the pigment particles are covered and stabilized with a dispersing agent at the same time with particle formation and thereby, a particle which has a finer size and narrower distribution of particle diameter can be obtained. Specifically, it is believed that, in the case where a dispersing agent is present when the dissolved organic pigment is precipitated, the dispersing agent can rapidly adsorb onto the surface of the precipitated pigment so that fine organic pigment particles can stably exist.

With respect to a method of bringing a solution comprising the organic pigment dissolved therein into contact with an aqueous medium, one liquid can be added to the other liquid or both liquids are supplied simultaneously and then can be admixed with each other by stirring. Speed of addition, magnitude of stirring and the like can be appropriately selected according to the purpose.

For preparing the "solution comprising the organic pigment dissolved therein", a method of dissolving the organic pigment preferably comprises using a solvent which has a high dissolving property and water miscibility. For example, a method using sulfuric acid, etc. can be mentioned. In addition, in the case where the organic pigment is a quinacridone type pigment, the solvent is preferably a mixture which comprises an aprotic polar organic solvent, water and an alkali. Specific examples of an aprotic polar organic solvent include dimethyl sulfoxide, dimethyl formamide, N-methyl-2-pyrrolidone, 2-pyrrolidone, tetramethyl urea and the like. The use amount of the aprotic polar organic solvent is suitably from 5 times to 20 times of the quinacridone type pigment. The ratio of the aprotic polar organic solvent to water (i.e., organic solvent/water) is preferably from 97/3 to 70/30 (weight ratio). In the case where water is absent or present in a small amount, complete dissolution of the quinacridone type pigment is difficult to achieve. On the other hand, in the case where water is present in an excess amount, dissolution is again difficult to achieve. With respect to the use amount of an alkali, it is preferably 1.5 mole or more, and more preferably from 2 mole to 3 mole, with respect to one mole of the quinacridone type pigment.

Examples of the aqueous medium include water, or a mixture comprising water and an aqueous solvent. With respect to the mixture, it is a liquid comprising 50% or more of water, or preferably 80% or more of water (based on volume %). Specific examples of the aqueous solvent include the water-soluble organic solvent that is described below.

With respect to a dispersion in which a pigment is dispersed, it is preferably subjected to a heat treatment or washed with a specific organic solvent.

As for the specific organic solvent, an ester-based solvent, a ketone solvent, an alcohol solvent, an aromatic solvent, and an aliphatic solvent are preferred. An ester solvent and a ketone solvent are more preferred. An ester solvent is particularly preferred. As for the ester solvent, examples include ethyl acetate, ethyl lactate, 2-(1-methoxy)propyl acetate and the like. As for the ketone solvent, examples include acetone, methyl ethyl ketone, methyl isobutyl ketone, cyclohexanone and the like. As for the alcohol solvent, examples include methanol, ethanol, n-butanol and the like. As for the aromatic solvent, examples include benzene, toluene, xylene and the like. As for the aliphatic solvent, examples include n-hexane, cyclohexane and the like. Among these, acetone and ethyl lactate are particularly preferred.

As described in the above, with a heat treatment or washing with a specific organic solvent, crystallinity of the pigment can be improved (i.e., strong crystals can be formed), and an image recorded by using an ink composition that is produced with such pigment dispersion (i.e., first liquid) can have a significantly improved weatherability. Temperature for the heat treatment (° C.) is preferably from 40° C. to 100° C. More preferably, it is from 40° C. to 90° C. Still more preferably, it is from 50° C. to 90° C. In addition, time for the heat treatment is preferably from ten minutes to three days. More preferably, it is from one hour to three days. Still more preferably, it is from six hours to two days. During the treatment period, the liquid can be allowed to sit or stirred.

In order to disperse a pigment, a dispersing agent can be used. The dispersing agent has an activity of (1) being rapidly adsorbed on the surface of a precipitated pigment and forming fine pigment particles, and also (2) preventing re-coagulation of the particles.

With respect to a dispersing agent, a surfactant, a polymer, a pigment derivative in which a polar substituent is introduced, a nonionic, anionic, cationic or an amphoteric compound, or the like can be used. These dispersing agents can be used alone or in a combination of two or more of them. As a preferred exemplary embodiment, an anionic surfactant is comprised in an aqueous medium and a non-ionic surfactant and/or a polymer is comprised in a solution in which an organic pigment has been dissolved.

Examples of the surfactant include an anionic surfactant such as an acylmethyl taurine salt, fatty acid salt, an alkyl sulfuric acid ester salt, an alkylbenzene sulfonic acid salt, an alkylnaphthalene sulfonic acid salt, a dialkylsulfosuccinic acid salt, an alkylphosphoric acid salt, naphtahlenesulfonic acid formalin condensate, a polyoxyethylene alkylsulfonic ester salt. Among these, acylmethyl taurine salt is preferred. The anionic surfactants can be used alone or in a combination of two or more of them.

Examples of a non-ionic surfactant include polyoxyethylene alkyl ether, polyoxyethylene alkyl aryl ether, polyoxyethylene fatty acid ester, sorbitan fatty acid ester, polyoxyethylene sorbitan fatty acid ester, polyoxyethylene alkylamine, glycerin fatty acid ester and the like. Among these, polyoxyethylene alkylaryl ether is preferred. The nonionic surfactant can be used alone or in a combination of two or more of them.

Examples of the polymer may include polyvinyl pyrrolidone, polyvinyl alcohol, polyvinyl methyl ether, polyethyleneoxide, polyethylene glycol, polypropylene glycol, polyacrylamide, vinyl alcohol-vinyl acetate copolymer, partially formalized polyvinyl alcohol, partially butyralized polyvinyl alcohol, vinyl pyrrolidone-vinyl acetate copolymer, polyethyleneoxide-propylene oxide block copolymer, polyacrylic acid salts, polyvinylsulfate salts, poly(4-vinylpyridine) salts, polyamide, polyallylamine salts, condensed naphthalene sulfonic acid salts, styrene-acrylic acid salt copolymer, styrene-methacrylic acid salt copolymer, acrylic acid ester-acrylic acid salt copolymer, acrylic acid ester-methacrylic acid salt copolymer, methacrylic acid ester-acrylic acid salt copolymer, methacrylic acid ester-methacrylic acid salt copolymer, styrene-itaconic acid salt copolymer, itaconic acid ester-itaconic acid salt copolymer, vinylnaphthalene-acrylic acid salt copolymer, vinylnaphthalene-methacrylic acid salt copolymer, vinylnaphthalene-itaconic acid salt copolymer, cellulose derivatives, and starch derivatives.

In addition, natural polymers such as alginic acid salt, gelatin, albumin, casein, gum Arabic, tragacanth gum, lignin sulfonic acid salt and the like can be included. Among these, styrene-acrylic acid salt copolymer and styrene-methacrylic acid salt copolymer are preferred. The polymers can be used alone or in a combination of two or more of them.

In addition to those described in the above, with respect to the nonionic compound, the anionic compound, the cationic compound, the amphoteric compound and the like, a copolymer of a monomer having an α,β-ethylenically unsaturated group can be included, for example.

Examples of the monomer having α,β-ethylenically unsaturated group may include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinylsulfonic acid, styrene sulfonic acid, vinylnaphthalene sulfonic acid, acrylamide, methacryloyloxyethyl phosphate, bismethacryloyloxyethyl phosphate, methacryloyloxyethylphenyl acid phosphate, ethylene glycol dimethacrylate, diethylene glycol dimethacrylate; styrene derivatives such as styrene, α-methylstyrene, vinyltoluene; vinylcyclohexane, vinylnaphthalene, vinylnaphthalene derivatives; alkyl acrylate which may be optionally substituted by an aromatic group; phenyl acrylate; alkyl methacrylate which may be optionally substituted by an aromatic group, phenyl methacrylate, cycloalkyl methacrylate, alkyl crotonate, dialkyl itaconate, dialkyl maleate, and derivatives thereof.

A polymer or a copolymer obtained by polymerizing one or a plurality of monomer having an α,β-ethylenically unsaturated group may be used as a polymer dispersant in the invention. Examples of the polymer dispersant may include acrylic acid alkyl ester-acrylic acid copolymer, methacrylic acid alkyl ester-methacrylic acid copolymer, styrene-acrylic acid alkyl ester-acrylic acid terpolymer, styrene-methacrylic acid phenyl ester-methacrylic acid terpolymer, styrene-methacrylic acid cyclohexyl ester-methacrylic acid terpolymer, styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, polystyrene, polyvinyl alcohol and the like.

An average molecular weight of the dispersing agent is preferably in the range of from 2,000 to 60,000, in terms of a weight average molecular weight. The addition ratio of the dispersing agent with respect to the pigment particles is preferably in the range of from 10% by mass to 100% by mass. More preferably, it is in the range of from 20% by mass to 70% by mass. Still more preferably, it is in the range of from 30% by mass to 50% by mass.

—Water Soluble Organic Solvent—

The first liquid of the invention comprises at least one water soluble organic solvent. The water soluble organic solvent is used as an agent for preventing drying, a humectant or an agent for promoting penetration. An agent for preventing drying is used for the prevention of blocking (clogging) of an ink discharge port in a spray nozzle due to coagulates that are formed by adhesion and drying of ink around the port. As for an agent for preventing drying or a humectant, a water soluble organic solvent which has a vapor pressure lower than that of water is preferred. In addition, an agent for promoting penetration is used for increasing the penetrability of ink into a paper.

The water soluble organic solvent that is comprised in the first liquid of the invention can be appropriately selected from known water soluble organic solvents, considering a function as an agent for preventing drying, a humectant or an agent for promoting penetration and also compatibility with water.

Examples of the water soluble organic solvent may include alkanediols (polyhydric alcohols) such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, maltose, cellobiose, lactose, sucrose, trehalose, and matotriose; sugar alcohols; hyaluronic acids; a so called solid humectant such as ureas; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono iso-propyl ether; 2-pyrrolidone, N-methyl-2-pyrrolidone, 1,3-dimethyl-2-imidazolidinone, formamide, acetoamide, dimethylsulfoxide, sorbitol, sorbitan, acetin, diacetin, triacetin, and sulfolane. The water soluble organic solvent may be used singly, or in a combination of two or more of them in the invention.

As for a humectant or a drying suppressant, polyhydric alcohols may be useful in the invention. Examples of the polyhydric alcohol may include, for example, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. The polyhydric alcohol may be used singly, or in a combination of two or more of them in the invention.

As for an agent for promoting penetration, a polyol compound is preferred. Examples of an aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol and the like. Among these, 2-ethyl-1,3-hexane diol and 2,2,4-trimethyl-1,3-pentane diol can be mentioned as a preferred examples.

The water soluble organic solvent can be used alone or in a combination of two or more of them.

The content of the water soluble organic solvent in first liquid is preferably in the range of from 1% by mass to 60% by mass. More preferably, it is in the range of from 5% by mass to 40% by mass.

—Water—

The first liquid of the invention comprises water, and the amount of water is not specifically limited. Still, the preferred amount of water is in the range of from 10% by mass to 99% by mass. More preferred amount is in the range of from 30% by mass to 80% by mass, and still more preferred amount is in the range of from 50% by mass to 70% by mass.

—Others—

The ink composition of the invention may comprise, in addition to the above described components, other components such as fine resin particles or a polymer latex, a surfactant, a UV absorbing agent, a fade preventing agent, a fungicide, a pH controlling agent, an anti-corrosive agent, an antioxidant, an emulsification stabilizer, an antiseptic, an antifoaming agent, a viscosity controlling agent, a dispersion stabilizer, a chelating agent and the like, if necessary.

As for the fine resin particle, for example, a fine particle comprising at least one of resin such as acrylic-based resin, vinyl acetate-based resin, styrene-butadiene-based resin, vinyl chloride-based resin, acrylic-styrene-based resin, butadiene-based resin, styrene-based resin, crosslinked acrylic resin, crosslinked styrene-based resin, benzoguanamine resin, phenol resin, silicone resin, epoxy resin, urethanebased resin, paraffin-based resin, or fluorocarbon resin; or a polymer latex including resin thereof may be used in the invention.

Among them, preferable examples may include a fine particle comprising acrylic-based resin, acrylic-styrene-based resin, styrene-based resin, crosslinked acrylic resin, or crosslinked styrene-based resin; and the polymer latex including resin thereof.

In the case where fine resin particles or a polymer latex are added to prepare an ink composition, they are added simultaneously with the pigment, etc. to prepare a pigment dispersion so as to achieve an improvement in fixing property.

A weight average molecular weight of the fine resin particles is preferably from 10,000 to 200,000 or less. More preferably, it is from 100,000 to 200,000.

An average particle diameter of the fine resin particles is preferably in the range of from 10 nm to 1 μm. More preferably, it is in the range of from 10 nm to 200 nm. Still more preferably, it is in the range of from 20 nm to 100 nm. Particularly more preferably, it is in the range of from 20 nm to 50 nm.

The addition amount of the fine resin particles is preferably in the range of from 0.5% by mass to 20% by mass. More preferably, it is in the range of from 3% by mass to 20% by mass, and still more preferably it is in the range of from 5% by mass to 15% by mass.

A glass transition temperature (Tg) of the fine resin particles is preferably 30° C. or higher. More preferably, it is 40° C. or higher. Still more preferably, it is 50° C. or higher.

The particle diameter distribution of polymer particles is not specifically limited, and any one having broad particle diameter distribution or monodispersed particle diameter distribution can be used. Further, two or more kinds of polymer particles having monodispersed particle diameter distribution can be used as a mixture.

The above described pH controlling agent is not specifically limited as long as it does not have an adverse effect on an ink composition to be produced and can adjust the pH to a desired value. It can be appropriately selected according to the purpose of use.

Examples of the pH controlling agent include alcohol amines (for example, diethanolamine, triethanolamine, 2-amino-2-ethyl-1,3-propanediol and the like), hydroxides of an alkali metal (for example, lithium hydroxide, sodium hydroxide, potassium hydroxide and the like), ammonium hydroxides (for example, ammonium hydroxide and quaternary ammonium hydroxide), phosphonium hydroxides, alkali metal carbonates and the like.

The above described surfactant is employed as an agent for controlling surface tension, and examples thereof include a nonionic, a cationic, an anionic and a betaine surfactant.

To achieve good discharge of ink with an inkjet method, the surfactant is comprised in an amount which can control the surface tension of the ink composition to be in the range of from 20 mN/m to 60 mN/m. Especially, it is preferred to have an amount which can control the surface tension to be in the range of from 20 mN/m to 45 mN/m. It is more preferred to have an amount which can control the surface tension to be in the range of from 25 mN/m to 40 mN/m.

With respect to the surfactant, a compound which has a structure comprising both a hydrophilic part and a hydrophobic part in the molecule can be effectively used. Further, any of an anionic surfactant, a cationic surfactant, an amphoteric surfactant, and a nonionic surfactant can be used.

Examples of the anionic surfactants include sodium dodecylbenzene sulfonate, sodium lauryl sulfate, disodium alkyldiphenylether disulfonate, sodium alkylnaphthalene sulfonate, dialkyl sulfosuccinate sodium salt, sodium stearate, potassium oleate, dioctyl sulfosuccinate sodium salt, sodium polyoxyethylene alkylether sulfate, sodium polyoxyethylene alkylphenylether sulfate, sodium oleate, sodium t-octylphenoxyethoxy polyethoxyethyl sulfate. These anionic surfactants may be used singly, or in a combination of two or more of them in the invention.

Examples of the nonionic surfactants include nonionic surfactants, such as polyoxyethylene lauryl ethers, polyoxyethylene octyl phenyl ethers, polyoxyethylene oleyl phenyl ethers, polyoxyethylene nonyl phenyl ethers, polyoxyethylene/oxypropylene block copolymers, t-octylphenoxyethyl polyethoxy ethanol, nonylphenoxyethyl polyethoxy ethanol. These, nonionic surfactants may be used singly or in a combination of two or more of them.

The cationic surfactants include surfactants such as tetraalkylammonium salts, alkylamine salts, benzalkonium salts, alkylpyridinium salts and imidazolium salts. Specific examples of the cationic surfactant include, for example, dihydroxyethyl stearyl ammonium hydroxide, 2-heptadecenyl-hydroxyethyl imidazolium hydroxide, lauryldimethylbenzylanmonium chloride, cetylpyridinium chloride, stearylamidomethylpyridinium chloride.

The content of the surfactant in the ink composition is not specifically limited. It is preferably 1% by mass or more, more preferably in the range of from 1% by mass to 10% by mass, and still more preferably in the range of from 1% by mass to 3% by mass.

Examples of the UV absorbing agent include benzophenone-based UV absorbing agent, benzotriazole-based UV absorbing agent, salicylate-based UV absorbing agent, cyanoacrylate-based UV absorbing agent, nickel complex salt-based UV absorbing agent, and the like.

As for the fade preventing agent, various types of organic or metal complex fade preventing agent can be used. Examples of the organic fade preventing agent include hydroquinones, alkoxyphenols, dialkoxyphenols, phenols, anilines, amines, indanes, chromanes, alkoxyanilines, heterocycles and the like. Examples of the metal complex include a nickel complex, a zinc complex and the like.

As for the fungicide, sodium dehydroacetic acid, sodium benzoic acid, sodium pyridinethion-1-oxide, p-hydroxybenzoic acid ethyl ester, 1,2-benzisothiazolin-3-one, sodium sorbate, sodium pentachlorophenol and the like can be included. The fungicide is preferably used in an amount of from 0.02% by mass to 1.00% by mass in the ink.

Examples of the anti-corrosive agent include acidic sulfite, sodium thiosulfate, ammonium thiodiglycolate, diisopropyl ammonium nitrite, pentaerythritol tetranitric acid, dicyclohexyl ammonium nitrite and the like.

Examples of the anti-oxidant include phenol-based anti-oxidant (including a hindered phenol-based anti-oxidant), amine-based anti-oxidant, sulfur-based anti-oxidant, phosphorous-based anti-oxidant and the like.

Examples of the chelating agent include sodium ethylenediamine tetraacetic acid, sodium nitrilotriacetic acid, sodium hydroxyethyl ethylenediamine triacetic acid, sodium diethylene triamine pentaacetic acid, and sodium uramyldiacetic acid and the like.

—Physical Properties of an Ink Composition—

A surface tension of the ink composition according to the invention is preferably from 20 mN/m to 60 mN/m (at 20° C.). More preferably, it is from 20 mN/m to 45 mN/m. Still more preferably, it is from 25 mN/m to 40 mN/m.

The surface tension is measured using a surface tensiometer (e.g., surface tensiometer CBVP-Z, manufactured by Kyowa Interface Science Corp.) according to Wilhelmy method at liquid temperature of 20° C. and at 60% RH.

In addition, the viscosity of the ink composition according to the invention at 20° C. is preferably from 1.2 mPa·s to 15.0 mPa·s, more preferably from 2 mPa·s or more but less than 13 mPa·s, and still more preferably 2.5 mPa·s or more but less than 10 mPa·s.

The viscosity is measured using VISCOMETER TV-22 (manufactured by TOKI SANGYO CO., LTD.) under the condition of testing the aqueous ink at 20° C.

The ink composition according to the invention can be used for forming a color image having multiple colors (e.g., full color image). For forming a full color image, an ink composition having a magenta hue, an ink composition having a cyan hue, and an ink composition having a yellow hue can be used. Further, in order to adjust the hue, an ink composition having a black hue can be also used.

Still further, in addition to the ink compositions having hues including yellow (Y), magenta (M), and cyan (C), an ink composition having other hues including red (R), green (G), blue (B), and white (W), or an ink composition having a so called specific color in a printing field can be used.

The ink composition having each of the hue can be prepared by freely modifying the hue of the pigments that are used as a colorant.

In the case where each of the average particle diameter of pigment particles included in a liquid having a magenta hue, a liquid having a cyan hue, and a liquid having a yellow hue is close to that of a liquid having a black hue, image blurring or deformation tend to occur easily. Thus, at least one of a liquid having a magenta hue, a liquid having a cyan hue, and a liquid having a yellow hue is employed as the ink composition, which is the first liquid of the invention (i.e., the liquid comprising a water soluble organic solvent, water and a pigment and having an average particle diameter of the pigment in the range of from 5 nm to 50 nm and the monodispersity of 1.5 or less), and also, as an ink composition having a black hue, a liquid having a black hue which comprises a black pigment with the average particle diameter (Mv) of at least 30 nm larger than that of the first liquid of the invention (i.e., at least one of a liquid having a magenta hue, a liquid having a cyan hue, and a liquid having a yellow hue) is preferably used in a combination. In this case, the average particle diameter corresponds to volume average particle diameter, similar to that described in the above.

Among these, the difference between the average particle diameter of pigment particles contained in a liquid having a black hue (i.e., $Mv^2$) and the average particle diameter of pigment particles contained in a liquid having a magenta hue, a liquid having a cyan hue, and a liquid having a yellow hue (i.e., $Mv^1$), e.g., $Mv^2$-$Mv^1$, is preferably in the range of from 30 nm to 100 nm in view of obtaining high resolution while inhibiting blurring, crack, etc. More preferably, it is in the range of 50 nm to 100 nm.

(Second Liquid)

The second liquid of the ink set for inkjet recording of the invention comprises at least a component which can reduce a pH of the first liquid (i.e., ink composition) to be on the acidic side (less than 7) when it is brought into contact with the first liquid, and if necessary, may comprise other components.

—Component which can Reduce pH to be on the Acidic Side—

The second liquid of the invention comprises at least one component which can reduce a pH of the ink composition to be on the acidic side. To the ink composition discharged with an inkjet method, the second liquid is added and mixed so that the pigment particles contained in the ink composition is transformed from a region in which the dispersion of the pigment particles is stable to a region in which the dispersion of the pigment particles is unstable. As a result, the pigment which has been stably dispersed in the ink composition is promoted to be coagulated.

In this process, a pH (at 25° C.) of the second liquid is preferably in the range of from 1 to 6, more preferably in the range of from 2 to 5. Still more preferably, it is in the range of from 3 to 5. At the same time, a pH (at 25° C.) of the ink composition is preferably 7.5 or more, and more preferably 8.5 or more.

In particular, from the viewpoints of image density, resolution and obtaining high speed inkjet recording, a pH (at 25° C.) of the ink composition is preferably 7.5 or more, and the pH (at 25° C.) of the second liquid is preferably 5 or less. In addition, it is preferable that the pH (at 25° C.) of the ink composition is reduced by 3.5 or more by the second liquid. More preferably, it is reduced by 4.5 or more.

An organic acid can be preferably mentioned as a component which can reduce a pH to be on the acidic side. The organic acid is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furane carboxylic acid, pyridine carboxylic acid, coumarine acid, thiophen carboxylic acid, nicotinic acid, derivatives thereof, and salts thereof. The compounds can be used alone or in a combination of two or more of them.

The component which can reduce a pH to be on the acidic side can be used alone or in a combination of two or more of them.

The content of the component which can reduce a pH to be on the acidic side is preferably in the range of from about 1% by mass to about 10% by mass in the second liquid. More preferably, it is in the range of from about 1.5% by mass to about 7% by mass. And still more preferably, it is in the range of from about 2% by mass to about 6% by mass.

<Method of Image Recording>

The method of image recording of the invention includes recording an image by using the ink set for inkjet recording of the invention described in the above. Preferably, the method of image recording of the invention comprises discharging the first liquid and discharging the second liquid, by using the ink set for inkjet recording of the invention described in the above. Specifically, on a recording medium, the first liquid which comprises a water soluble organic solvent, water and a pigment dispersed therein and has the average particle diameter of the pigment in the range of from 5 nm to 50 nm and the monodispersity of 1.5 or less is discharged according to an inkjet method and then the second liquid which comprises a component that can reduce a pH of the first liquid to be on the acidic side and can transform the first liquid from a region in which the dispersion of the pigment particles is stable to a region in which the dispersion of the pigment particles is unstable is discharged to the recording medium. As a result, the first liquid and the second liquid are brought into contact with each other to form an image.

More preferably, the method of image recording of the invention comprises discharging the first liquid after discharging the second liquid.

For discharging the first liquid, the first liquid (i.e., ink composition) is discharged according to an inkjet method. Specifically, with an energy supply, to a desired recording medium, i.e., a plain paper, a resin-coated paper, a paper exclusive for an inkjet printer described, for example, in publications of JP-A Nos. 8-169172, 8-27693, 2-276670, 7-276789, 9-323475, 62-238783, 10-153989, 10-217473, 10-235995, 10-337947, 10-217597, etc., a film, a paper for electronic photograph, cloth, glass, a metal, or a porcelain, the ink composition is discharged and a colored image can be formed. In addition, as a method of inkjet recording preferred for the invention, those disclosed in the paragraph Nos. 0093-0105 of JP-A No. 2003-306623 can be used.

The inkjet method is not specifically limited and can be any of a charge control method which comprises discharging ink using an electrostatic inducing force, drop on demand method (i.e., pressure pulse method) which utilizes vibration pressure of a piezoelectric element, a sonic inkjet method which comprises discharging ink by utilizing a radiation pressure after the electric signal is converted into a sonic beam and radiated onto ink, or a thermal inkjet method (registered trademark; Bubblejet) which comprises forming air bubbles by heating ink and utilizing the pressure generated therefrom. With respect to the inkjet method, the method which is described in JP-A No. 54-59936, which comprises introducing a drastic volume change in ink by the action of heat energy, and discharging ink from a nozzle based on the working power generated from the change, can be effectively used.

In addition, the above described inkjet method includes a method which comprises discharging many times a small volume of the ink with low concentration (so called, photoink), a method which comprises improving the quality of image by using a plurality of ink having substantially the same hue but with different concentration, or a method which comprises using a colorless and transparent ink.

In addition, the inkjet head that is used for the inkjet method can be either of a demand type or a continuous type. Further, specific examples of a discharging method include electrics-mechanics conversion method (for example, single cavity type, double cavity type, bender type, piston type, share mode type, shared wall type and the like), electrics-heat conversion method (for example, thermal inkjet type, Bubblejet type (registered trademark)), an electrostatic suction method (for example, electric system control type, slit jet type and the like) and a discharge method (for example, a spark jet type and the like) and the like. Any of these discharge methods can be used.

Further, the ink nozzle which can be used for recording according to the inkjet method is not specifically limited. Rather, depending on the purpose of use, it can be appropriately selected.

For the application of the second liquid, it can be discharged on a recording medium either before or after the discharge of the first liquid. The discharge of the second liquid can be carried out by a known method such as a coating method, an inkjet method and an impregnation method. With respect to a coating method, a known coating method using a bar coater, an extrusion die coater, an air doctor coater, a blade coater, a rod coater, a knife coater, a squeeze coater, a reverse roll coater, or the like can be used. Details about an inkjet method are the same as those described in the above.

According to the invention, it is preferable that, for discharging the second liquid, the first liquid is discharged after discharging the second liquid. That is, a preferred exemplary embodiment includes that, before discharging the first liquid (i.e., ink composition) on a recording medium, the second liquid which can transform the ink composition from a region in which the dispersion of the pigment particles is stable to a region in which the dispersion of the pigment particles is unstable (for example, coagulating the pigments) is discharged, and thereafter, the ink composition is discharged to be in contact with the second liquid, which has been already discharged on the recording medium, so as to form an image.

As a result, inkjet recording can be performed at a high speed, and at the same time an image with high density and high resolution can be obtained.

For recording an image, a polymer latex compound may be also used for obtaining gloss or water resistance or improving weatherability. With respect to the time frame during which the polymer latex compound is applied, it can be any time before and after the discharge of an ink composition. In addition, they can be applied simultaneously. Thus, the polymer latex compound can be used in any mode in which it is applied to a recording medium, added to an ink composition, or provided as a separate liquid comprising the polymer latex compound.

Specifically, the methods that are described in JP-A Nos. 2002-166638, 2002-121440, 2002-154201, 2002-144696, and 2002-080759 can be preferably used.

The method of image recording of the invention may comprise an additional step in addition to discharging a first liquid by which an ink composition is applied and discharging a second liquid by which a second liquid is applied. Additional step is not specifically limited and can be appropriately selected depending on the purpose. For example, drying and removing an organic solvent that is comprised in the ink composition discharged to a recording medium, melt-fixing a polymer latex or resin particles comprised in the ink composition, and the like can be included.

Another example of image recording of the invention includes using an intermediate transfer body as a recording medium to which an image is first formed, discharging on the intermediate transfer body, the first liquid which comprises a water soluble organic solvent, water and a pigment dispersed therein and has an average particle diameter of the pigment in the range of from 5 nm to 50 nm and the monodispersity of 1.5 or less according to an inkjet method, discharging the second liquid which comprises a component that can reduce the pH of the first liquid to be on the acidic side and can transform the first liquid from a region in which the dispersion of the pigment particles is stable to a region in which the dispersion of the pigment particles is unstable on the intermediate transfer body, having the ink composition and the second liquid brought into contact with each other to form an image on the intermediate transfer body, and lastly transferring the image formed on the intermediate transfer body to a final recording medium.

Even for this case, substantially similar to that described in the above, other processes like a drying and removing process, a heating and fixing process and the like can be further included. In addition, with respect to the discharge of the first liquid and the discharge of the second liquid, it is preferable that the first liquid is discharged after discharging the second liquid.

EXAMPLES

Herein below, the invention is explained in greater detail in view of the following Examples. However, as long as it remains within the main spirit of the invention, it is not limited to the following Examples. In addition, unless specifically mentioned otherwise, the term "part" is based on mass.

Example 1

Synthesis of Polymer

Synthetic Example 1

A 2,000 mL separable flask which is equipped with a stirrer, a reflux column, a thermometer and a dropping funnel was subjected to nitrogen gas replacement, and 200.0 parts of diethylene glycol monomethyl ether was added followed by raising the temperature to 80° C. while stirring. Subsequently, to the dropping funnel 200.0 parts of diethylene glycol monomethyl ether, 483.0 parts of benzyl acrylate, 100.8 parts of acrylic acid and 4.8 parts of t-butylperoxy(2-ethylhexanoate) were added, and then added dropwise to the separable flask at 80° C. over 4 hours. Upon completion of the dropwise addition, the mixture was maintained at 80° C. for 1 hour. Then, 0.8 parts of t-butylperoxy(2-ethylhexanoate) was added, and the reaction was again allowed to proceed at 80° C. for 1 hour. After that, by distillation under reduced pressure, diethylene glycol monomethyl ether was removed. 600.0 parts of methyl ethyl ketone was added to obtain a polymer composition solution having 50% by mass of the solids in resin.

A part of thus obtained polymer composition solution was taken and dried with a powerful heat dryer at 105° C. for one hour. Then, an acid number and weight average molecular weight of the solids of thus obtained polymer composition were measured. As a result, it was found that the acid number was 130 mgKOH/g and the weight average molecular weight was 28,000.

Weight average molecular weight was obtained using a differential refractometer (solvent; THF) based on GPC analytical apparatus using TSKgel GMHxL, TSKgel G4000HxL, TSKgel G2000HxL columns (all manufactured by Tosoh Corp.) and conversion of the obtained value was made in view of polystyrene as a standard material.

Synthetic Example 2

Regarding the above described Synthetic example 1, except that 77.4 parts of acrylic acid was used instead of 100.8 parts of acrylic acid, the polymer was synthesized in a manner substantially similar to Synthetic example 1 to obtain a polymer composition solution. A part of thus obtained polymer composition liquid was taken and dried with a powerful heat dryer at 105° C. for one hour. Then, an acid number and weight average molecular weight of the solids of thus obtained polymer composition were measured. As a result, it was found that the acid number was 98 mgKOH/g and the weight average molecular weight was 34,000. The measurement of the weight average molecular weight was carried out in a similar manner to that described in the above.

Preparation of Latex

Synthetic Example 3

To 120 g of water, 19.7 g of LATEMUL ASK (carboxylic acid salt type emulsifier, manufactured by Kao Corporation), 6 g of 5 mol/L sodium hydroxide aqueous solution and 0.3 g of 2,2'-azobis(2-amidinopropane)dihydrochloride were added and homogeneously dissolved. The resulting solution was heated to 70° C., and then a monomer mixture comprising 25.8 g of styrene, 26.4 g of butyl acrylate and 5.1 g of acrylic acid was added thereto over 2 hours under nitrogen stream. Thereafter, the mixture was heated at 70° C. for 2 hours and at 80° C. for three hours. After cooling to room temperature, 1 mol/L sodium hydroxide aqueous solution was added under stirring to have a pH around 9. As a result, latex dispersion LX-1 was obtained. The solid content in the latex dispersion was 33% by mass.

—Preparation of Aqueous Ink (Magenta Ink) 101—

First, with a method described below (i.e., build up method), pigment dispersion A was prepared.

As a dispersing agent, 4 parts of the solids (dry matter) of the polymer composition solution that had been obtained from the above Synthetic example 1 was dissolved in 80 parts of dimethyl sulfoxide. Then, 10 parts of C.I. Pigment Red 122 (quinacridone pigment) was added and suspended in the flask containing the solution at 25° C. under air atmosphere. Next, a 25% methanol solution of tetramethyl ammonium hydroxide (manufactured by Wako Pure Chemical Corp.) was added dropwise in small portion to dissolve the quinacridone pigment. As a result, deep bluish purple-colored pigment solution was obtained. This pigment solution was stirred for 3 hours and then, using two sets of system dispenser (manufactured by Musashi Engineering, Inc., inside diameter of a needle: 0.58 mm, discharge pressure: 4.0 kgf/cm$^2$) rapidly added to ice cold ion exchange water (0° C., in an amount of 400 parts with respect to 10 parts of the pigment) stirred by an impeller type stirring wing (800 r.p.m.). A transparent and reddish pigment dispersion was obtained.

A volume average particle diameter of the resulting pigment dispersion was measured by the method described below according to a dynamic light scattering method. As a result, it was found that the volume average particle diameter was 48.7 nm (TEM average particle diameter: 34.3 nm) and the monodispersity, which is an indicator of monodispersibility [the ratio of volume average particle diameter Mv/number average particle diameter Mn] was 1.50.

Next, hydrochloric acid was added dropwise to the pigment dispersion to adjust the pH to be 3.5, and the pigment particles were coagulated from the pigment dispersion. Subsequently, the coagulants were filtered under reduced pressure using a membrane filter having a mean pore diameter of 0.2 μmm and washed twice with ion exchange water to obtain a paste of pigment particle dispersion that is free of salts and solvents.

Next, to the resulting paste, 100 parts of acetone was added and stirring and ultrasonic treatment was carried out. Then, the mixture was filtered under reduced pressure using a membrane filter having a mean pore diameter of 0.2 μm. The paste obtained after the filtration was washed with ion exchange water, again filtered under reduced pressure using a membrane filter having a mean pore diameter of 0.2 μmm to obtain a dispersion paste comprising the pigment particles.

Then, to thus obtained dispersion paste, a small amount of ion exchange water was added, a 15% aqueous solution of tetramethyl ammonium hydroxide (manufactured by Wako Pure Chemical Corp.) was added, followed by addition of ion exchange water and stirring for one hour. Ion exchange water was again added to have the pigment comprised in an amount of 10% by mass. Further, a 15% aqueous solution of tetramethyl ammonium hydroxide was added to adjust the pH to be 9.3 to obtain pigment dispersion A.

By using the pigment dispersion A, magenta ink 101 (pH=8.8 (25° C.)) having the composition shown below was prepared.

After diluting this magenta ink 101 to 50 times with ultra pure water, volume average particle diameter Mv was measured by the method described below according to dynamic light scattering method. As a result, it was found that the volume average particle diameter was 49.0 nm (TEM average particle diameter: 34.8 nm) and the monodispersity as an indicator of monodispersibility [the ratio of volume average particle diameter Mv/number average particle diameter Mn] was 1.50 (the particle diameter was measured using a liquid which had been prepared so as not to have latex dispersion LX-1 by a preparation method similar to that of magenta ink 101). After two weeks of storage, there was no change in particle diameter. In addition, no precipitated matter was found and no discoloring was observed.

| <Composition> | |
|---|---|
| pigment dispersion A described in the above | 40.0 g |
| diethylene glycol | 12.0 g |
| glycerin | 18.0 g |
| latex dispersion LX-1 described in the above | 18.2 g |
| Olfin E1010 (manufactured by Nissin Chemical Corp.) | 0.9 g |
| water | an amount to give the total weight of 100 g |

—Preparation of Aqueous Inks 102-105—

By changing the amount of the polymer composition solution or the amount of a 25% methanol solution of tetramethyl ammonium hydroxide (manufactured by Wako Pure Chemical Corp.), magenta-colored aqueous inks 102 to 105, which have various average particle diameter Mv and monodispersity of the pigment as described in Table 1, were obtained. The pH of thus obtained aqueous ink was all 8.8 at 25° C. The method of measuring average particle diameter and monodispersity of the pigment is the same as described below.

—Preparation of Aqueous Ink 107 (Comparative Ink)—

First, according to the method described below (hereinafter, referred to as a "breakdown method"), pigment dispersion B was prepared.

To 120.0 parts of the polymer composition which had been prepared in the above Synthetic example 2, 3.0 parts of a 30% aqueous solution of sodium hydroxide was added followed by addition of 480.0 parts of C.I. Pigment Red 122 (i.e., magenta pigment). The resulting mixture was subjected to a dispersion treatment for 12.5 hours at cycle speed of 8 m/s using Pico mill (manufactured by Asadatekko Co., Ltd, dispersion medium: zirconium, temperature: 20° C., weight ratio of dispersion medium/dispersion: 8/2) to obtain a slurry of a pigment dispersion. Further, by repeating a process of dispersing this pigment dispersion slurry ten times at 200 MPa pressure with an ultrahigh pressure homogenizer (i.e., microfluidizer, manufactured by MIZUHO industrial Co., Ltd.), a pigment dispersion was obtained.

Further, with evaporation under reduced pressure of the pigment dispersion obtained from above using an evaporator, some of methyl ethyl ketone and water was removed and the resulting mixture was subjected to centrifugation at 5,000 r.p.m. for 30 minutes by using a centrifuge (05P-21, manufactured by Hitachi Koki Co., Ltd.). After that, ion exchange water was added to have the pigment concentration to be 16% by mass, yielding pigment dispersion B. Then, by using a membrane filter having a pore size of 2.5 μm (manufactured by AdvanTech Co.), the dispersion was filtered under pressure.

The pigment dispersion B that had been obtained after the filtration was used to prepare magenta ink 107 (pH=8.8 (25° C.)) having the composition shown below.

After diluting this magenta ink 107 to 500 times with ultra pure water, volume average particle diameter Mv was measured by the method described below according to a dynamic light scattering method. As a result, it was found that the volume average particle diameter was 49.0 nm (TEM average particle diameter: 27.3 nm) and the mondispersity as an indicator of a monodispersibility [the ratio of volume average particle diameter Mv/number average particle diameter Mn] was 1.70 (the particle diameter was measured by using a liquid which had been prepared so as not to have latex dispersion LX-1 by a preparation method similar to that of magenta ink 107).

| <Composition> | |
|---|---|
| pigment dispersion B described in the above | 25.0 g |
| diethylene glycol | 12.0 g |
| glycerin | 18.0 g |
| latex dispersion LX-1 described in the above | 18.2 g |
| Olfin E1010 (manufactured by Nissin Chemical Corp.) | 0.9 g |
| water | an amount to give the total weight of 100 g |

—Preparation of Aqueous Inks 108-109—

By changing the time for dispersion treatment compared to the process in the preparation of aqueous ink 107 described above, aqueous inks 108 and 109, which have different average particle diameter Mv and monodispersity of the pigment as described in Table 1, were obtained. The pH of thus obtained aqueous ink was all 8.8 at 25° C. The method of measuring average particle diameter and monodispersity of the pigment is the same as described below.

—Measurement of Average Particle Diameter and Monodispersity—

[1. Volume Average Particle Diameter (Mv)]

For the obtained aqueous inks, volume average particle diameter (secondary particle) was measured according to a dynamic light scattering method using Microtrac particle size analyzer (trade name: Version 10.1.2-211BH, manufactured by Nikkiso Corp.). The measurement of particle diameter of pigment was carried out by preparing a test sample which had been prepared by adding 10 mL of ion exchange water to 10 μL of the aqueous ink not comprising LX-1 to avoid the influence of LX and adjusting the temperature of the resulting sample to be 25° C. The measurement results are summarized in the following Table 1.

[2. Monodispersity]

For the obtained aqueous inks, using a test sample which had been prepared by adding 10 mL of ion exchange water to 10 μL of the aqueous ink (25° C.), volume average particle diameter (Mv) and number average particle diameter (Mn) were measured in a similar manner to that described for the measurement of Mv above, according to a dynamic light scattering method using Microtrac particle size analyzer (trade name: Version 10.1.2-211BH, manufactured by Nikkiso Corp.). As a result, the ratio (Mv/Mn) of volume average particle diameter (Mv) to number average particle diameter (Mn) was obtained. The measurement results are summarized in the following Table 1.

—Preparation of Aqueous Coagulated Liquid 1—

Components are mixed to give the composition described below and the pH was adjusted to be 3.3 by using sodium hydroxide solution to obtain aqueous coagulated liquid 1 (i.e., second liquid).

| <Composition> | |
|---|---|
| citric acid | 15 parts |
| ion exchange water | 84 parts |
| Olfin E 1010 (manufactured by Nissin Chemical Corp.) | 1 part |

—Preparation of Aqueous Coagulated Liquid 2—

Components are mixed to give the composition described below to obtain aqueous coagulated liquid 2 (i.e., second liquid). The pH of this aqueous coagulated liquid was 7.8 at 25° C.

| <Composition> | |
|---|---|
| magnesium nitrate•hexahydrate | 15.0 parts |
| ion exchange water | 69.0 parts |
| Olfin E 1010 (manufactured by Nissin Chemical Corp.) | 1.0 part |
| glycerin | 15.0 parts |

According to the above descriptions, magenta-colored aqueous inks 101-105, 107-109, and aqueous coagulated liquids 1-2 were prepared. After combining them as shown in the following Table 1, ink sets 101-109 were prepared.

—Evaluation of Ink Set—

The ink sets obtained from the above were evaluated as follows. The evaluation results are summarized in the following Table 1.

<1. Blurring>

As an inkjet recording apparatus, an image recording apparatus equipped with an experimental print head was prepared so as to receive an external liquid, wherein the apparatus has specific features as follows;
head: full line head having width of 1,200 dpi/20 inch
discharge amount of liquid drops: four values of 0, 2.0, 3.5, and 4.0 pL (picoliter) were recorded
operation frequency: 30 kHz (conveying speed of the recording medium, 635 mm/sec).

To this apparatus, the ink set obtained above was loaded, and the aqueous coagulated liquid and the aqueous ink were discharged from a separate discharge nozzle in this order on a wood free paper (trade name: Shiraoi, 76.5 g/m$^2$, manufactured by Nippon Paper, Inc.) to record an magenta image. After drying, the image was fixed by heating for 10 seconds at 100° C. Then, the degree of blurring in the image portion was sensory evaluated by visual observation according to the evaluation criteria described below.

<Evaluation Criteria>
A . . . almost no blurring is occurred.
B . . . small amount of blurring is occurred.
C . . . blurring is occurred, but it is within the practically accepted limit.
D . . . blurring is great, and it is beyond the limit that is practically accepted.
E . . . blurring is significant.

<2. Image Deformation>

In a similar manner to that described above in <1. Blurring>, a magenta image (5 cm×5 cm) was recorded. After drying, the image was fixed by heating for 10 seconds at 100° C. Then, the image portion was evaluated by visual observation according to the evaluation criteria described below.

<Evaluation Criteria>
A . . . almost no crack or defect is occurred in the image portion.
B . . . only a small amount of crack or defect is occurred.
C . . . crack or defect is occurred, but is within the practically accepted limit.
D . . . crack or defect is great, and is beyond the limit that is practically accepted.
E . . . crack or defect is significant.

<3. Resistance to Light>

In a similar manner to that described above in <1. Blurring>, a magenta image was recorded on an inkjet paper (photographic paper <Gloss>, manufactured by EPSON). After drying the magenta image in air for 24 hours, the image density Ci was measured using Gretag Spectrolino (trade name, manufactured by Gretag Company). After the measurement, using a weather meter manufactured by Atlas Company, Xe light (100,000 lux) was continuously irradiated for 30 days on the image. Then, using a similar method, the image density Cf for the region wherein the reflection density was 1.0 before the Xe irradiation was measured. Residual pigment ratio (%) was obtained according to the following equation, and then evaluated according to the evaluation criteria described below.

Residual pigment ratio (%)=$Cf/Ci$×100

<Evaluation Criteria>
A . . . Residual pigment ratio is 90% or more.
B . . . Residual pigment ratio is 75% or more but less than 90%.
C . . . Residual pigment ratio is less than 75%.

TABLE 1

| Ink set No. | Ink type | Method of preparing pigment particles (*1) | Particle diameter Mv [nm] | Mono-dispersity | Second liquid | Image deformation | Resistance to light | Blurring | Notes |
|---|---|---|---|---|---|---|---|---|---|
| 101 | Aqueous ink 101 | BU method | 49.0 | 1.50 | Aqueous coagulated liquid 1 (citric acid) | C | A | B | Example |
| 102 | Aqueous ink 102 | BU method | 28.0 | 1.50 | Aqueous coagulated liquid 1 (citric acid) | B | A | B | Example |
| 103 | Aqueous ink 103 | BU method | 19.0 | 1.50 | Aqueous coagulated liquid 1 (citric acid) | A | A | B | Example |
| 104 | Aqueous ink 104 | BU method | 28.0 | 1.30 | Aqueous coagulated liquid 1 (citric acid) | B | A | A | Example |
| 105 | Aqueous ink 105 | BU method | 19.0 | 1.30 | Aqueous coagulated liquid 1 (citric acid) | A | A | A | Example |

TABLE 1-continued

| Ink set No. | Ink type | Method of preparing pigment particles (*1) | Particle diameter Mv [nm] | Mono-dispersity | Second liquid | Image deformation | Resistance to light | Blurring | Notes |
|---|---|---|---|---|---|---|---|---|---|
| 106 | Aqueous ink 102 | BU method | 28.0 | 1.50 | Aqueous coagulated liquid 2 (polyvalent cation) | D | A | D | Comparative example |
| 107 | Aqueous ink 107 | BD method | 49.0 | 1.70 | Aqueous coagulated liquid 1 (citric acid) | D | C | C | Comparative example |
| 108 | Aqueous ink 108 | BD method | 61.0 | 1.70 | Aqueous coagulated liquid 1 (citric acid) | D | B | C | Comparative example |
| 109 | Aqueous ink 109 | BD method | 61.0 | 1.50 | Aqueous coagulated liquid 1 (citric acid) | D | A | C | Comparative example |

(*1) BU method: build up method BD method: breakdown method

As described in the above Table 1, according to the Example, image blurring and image deformation were inhibited and resistance to light was favorable. On the other hand, according to the comparative example 106 in which a polyvalent cation was used, image blurring and image deformation due to crack or the like were significant, and the quality of image was extremely poor. In addition, according to the comparative example 108 which does not satisfy the requirements of 5 nm≦Mv≦50 nm and monodipsersity ≦1.5, image blurring occurred and image deformation due to crack or the like was significant, and the quality of image was also poor.

Example 2

Preparation of Aqueous Ink 201 (Black Ink)

Except that the magenta pigment C.I. Pigment Red 122 (480.0 parts) was replaced with 480.0 parts of carbon black "S170" (manufactured by Evonik Degussa Japan Co., Ltd.) for the preparation, pigment dispersion C was prepared in a manner substantially similar to that in the pigment dispersion B of Example 1.

The pigment dispersion C was used to prepare black ink 201 (pH=8.5 (25° C.)) having the composition described below.

Regarding the average particle diameter of this black ink 201, a solution comprising this black ink 201 from which latex dispersion LX-1 had been removed was prepared, similar to the above described aqueous ink 101. The resulting solution was diluted to 1,000 times with ultra pure water, and its volume average particle diameter Mv was measured by the method described above according to a dynamic light scattering method. As a result, it was found that the volume average particle diameter Mv was 81.0 nm (TEM average particle diameter: 46.9 nm) and the monodispersity as an indicator of monodispersibility [the ratio of volume average particle diameter Mv/number average particle diameter Mn] was 1.68.

| <Composition> | |
|---|---|
| pigment dispersion C described in the above | 40.0 g |
| diethylene glycol | 12.0 g |
| glycerin | 18.0 g |
| latex dispersion LX-1 described in the above | 18.2 g |
| Olfin E1010 (manufactured by Nissin Chemical Corp.) | 0.9 g |
| water | an amount to give the total weight of 100 g |

—Preparation of Aqueous Inks 202-203—

Regarding the above described aqueous ink 201, the volume average particle diameter Mv was adjusted by carrying out a centrifuge for 30 minutes with 20,000 revolution using a centrifuge machine in addition to changing the condition for dispersion to obtain aqueous inks 202 and 203 having black color. The pH of the obtained aqueous ink was all 8.5 at 25° C. In addition, the average particle diameter was measured in a similar manner to that in Example 1. The measurement results are summarized in the following Table 2.

—Preparation of Aqueous Coagulated Liquid 1—

Coagulated liquid 1 (i.e., second liquid) was prepared by a method similar to that in Example 1. The pH of this aqueous coagulated liquid at 25° C. was 3.3.

—Evaluation of Ink Set—

To the apparatus which is the same as the one used in Example 1, black-colored aqueous ink 201-203 were loaded in this order together with magenta-colored aqueous ink 104 and the aqueous coagulated liquid 1 (comprising citric acid) prepared in Example 1, and then the resulting aqueous coagulated liquid 1 and the aqueous ink (any one of the aqueous ink 104 and the aqueous inks 201-203) were discharged in the order from a separate discharge nozzle on an inkjet paper (photographic paper <Gloss>, manufactured by EPSON). As a result, an image in which color patches having magenta or black color (1 cm×1 cm; width×height) are alternately formed was recorded. The magenta-colored image portion was evaluated in a manner substantially similar to that in Example 1 in terms of image blurring, image deformation, and resistance to light. The evaluation results are summarized in the following Table 2.

TABLE 2

| Ink set No. | Aqueous ink 104 (magenta color: BU method) | | Ink type | Aqueous ink (black color) | Image deformation | Resistance to light | Blurring | Notes |
| --- | --- | --- | --- | --- | --- | --- | --- | --- |
| | Particle diameter Mv [nm] | Mono-dispersity | | Particle diameter Mv [nm] | | | | |
| 201 | 28.0 | 1.30 | Aqueous ink 201 | 81.0 | B | A | A | Example |
| 202 | 28.0 | 1.30 | Aqueous ink 202 | 59.0 | C | A | B | Example |
| 203 | 28.0 | 1.30 | Aqueous Ink 203 | 48.0 | C | A | C | Example |

As described in the above Table 2, in the case where size difference is formed for average particle diameter of the pigments for magenta and black aqueous ink, image blurring or image deformation, which can easily occur when two colors are used, can be prevented. In addition, resistance to light was favorable.

Example 3

Preparation of Aqueous Ink 301 (Cyan Ink)

1 part of C.I. Pigment Blue 15:3 as a pigment and 2 parts of polyvinyl pyrrolidone K25 (trade name, manufactured by Tokyo Kasei Co, Ltd.) were added at room temperature to 50 parts of methanesulfonic acid, stirred for 2 hours, followed by dissolving the pigments by dropwise addition of a small amount of formic acid. As a result, the pigment solution was obtained.

Thus obtained pigment solution was subjected to an ultrasonic treatment. Then, by using a system dispenser (manufactured by Musashi Engineering, Inc., inside diameter of a needle: 0.58 mm, discharge pressure: 4.0 kgf/cm$^2$), the solution was rapidly added to 500 parts of ice cold ion exchange water stirred by an impeller type stirring wing (800 r.p.m.). As a result, a transparent and bluish pigment dispersion was obtained. Then, by using an ultrafiltration apparatus (UHP-62K, manufactured by AdvanTech Toyo Company, cut-off molecular weight of 50,000), purification was carried out while maintaining the volume by adding distilled water and removing the filtrate. The pigment was concentrated to 10.0% by mass, and then sodium oleate was added in an amount of 20% by mass with respect to the pigment followed by ultrasonic dispersion treatment. As a result, pigment dispersion D was obtained.

Except that the pigment dispersion A which had been used for the preparation of the aqueous ink 101 of the Example 1 was replaced with the pigment dispersion D, aqueous ink (cyan ink) 301 was prepared in a manner substantially similar to that in aqueous ink 101. In this process, aqueous ink 301 was adjusted to have a volume average diameter Mv of 28 nm and a monodispersity of 1.3. The pH of thus obtained aqueous ink 301 was 8.6 at 25° C.

Next, except that the magenta-colored aqueous ink 104 of the Example 2 was replaced with the cyan-colored aqueous ink 301, an image in which color patches having cyan or black color (1 cm×1 cm; width×height) are alternately formed was recorded in a similar manner to that in Example 2. Then, the cyan-colored image portion was evaluated in a manner substantially similar to that in Example 1 in terms of image blurring, image deformation, and resistance to light. The evaluation indicates similar results to the results in Example 2.

Example 4

Except that the magenta pigment C.I. Pigment Red 122 used for "Preparation of aqueous inks 101 to 105" of Example 1 was replaced with the yellow pigment C.I. Pigment Yellow 74, yellow-colored aqueous ink (yellow ink) 401 (i.e., first liquid) was prepared in a manner substantially similar to that in Example 1. In this process, this yellow-colored aqueous ink 401 was adjusted to have a volume average diameter Mv of 28 nm and a monodispersity of 1.3. The pH of thus obtained aqueous ink was 8.9 at 25° C.

Next, except that the magenta-colored aqueous ink 104 of the Example 2 was replaced with the yellow-colored aqueous ink 401, an image in which color patches having yellow or black color (1 cm×1 cm; width×height) are alternately formed was recorded in a similar manner to that in Example 2. Then, the yellow-colored image portion was evaluated in a manner substantially similar to that in Example 1 in terms of image blurring, image deformation, and resistance to light. The evaluation indicates similar results to the results in Example 2.

According to the invention, an ink set for inkjet recording which has excellent resistance to light and can be used for preventing image blurring and image deformation due to crack or the like and a method of image recording using the same are provided.

Namely, the present invention may provide the following items <1> to <12>.

<1> An ink set for inkjet recording comprising: a first liquid which contains a water soluble organic solvent, water and a pigment dispersed therein in which an average particle diameter of the pigment is from 5 nm to 50 nm and a monodispersity of the pigment is 1.5 or less, and a second liquid which contains a component that can reduce a pH of the first liquid to less than 7 when contacted with the first liquid and can transform the first liquid from a region in which the dispersion of the pigment particles is stable to a region in which the dispersion of the pigment particles is unstable.

<2> The ink set for inkjet recording of item <1>, wherein the first liquid further contains a dispersing agent.

<3> The ink set for inkjet recording of item <2>, wherein the dispersing agent has a weight average molecular weight in the range of from 2,000 to 60,000 and an addition ratio of the dispersing agent with respect to the pigment is in the range of from 10% by mass to 100% by mass.

<4> The ink set for inkjet recording of any one of items <1> to <3>, wherein the pigment is produced by a build up method.

<5> The ink set for inkjet recording of any one of items <1> to <4>, wherein the pigment is an encapsulated pigment.

<6> The ink set for inkjet recording of any one of items <1> to <5>, wherein the first liquid has a pH of 7.5 or more and the second liquid has a pH of 5 or less.

<7> The ink set for inkjet recording of any one of items <1> to <6>, wherein at least one of the first liquid is a magenta hue liquid containing a magenta hue pigment as the pigment, and the first liquid further comprises a black hue liquid containing a black hue pigment which has an average particle diameter that is at least 30 nm larger than that of the magenta hue pigment.

<8> The ink set for inkjet recording of any one of items <1> to <6>, wherein at least one of the first liquid is a cyan hue liquid containing a cyan hue pigment as the pigment, and the first liquid further comprises a black hue liquid containing a black hue pigment which has an average particle diameter that is at least 30 nm larger than that of the cyan hue pigment.

<9> The ink set for inkjet recording of any one of items <1> to <6>, wherein at least one of the first liquid is a yellow hue liquid containing a yellow hue pigment as the pigment, and the first liquid further comprises a black hue liquid containing a black hue pigment which has an average particle diameter that is at least 30 nm larger than that of the yellow hue pigment.

<10> The ink set for inkjet recording of any one of items <1> to <6>, wherein at least a black hue liquid, a cyan hue liquid, a magenta hue liquid and a yellow hue liquid are comprised as the first liquid.

<11> A method of image recording using the ink set for inkjet recording of any one of items <1> to <10>.

<12> The method of image recording of item <11>, comprising discharging the first liquid and discharging the second liquid.

<13> The method of image recording of item <12>, comprising discharging the first liquid after discharging the second liquid.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An ink set for inkjet recording comprising:
   a first liquid which contains a water soluble organic solvent, water and a pigment dispersed therein, in which an average particle diameter of the pigment is from 5 nm to 50 nm and a monodispersity of the pigment is 1.5 or less; and
   a second liquid which contains a component that can reduce a pH of the first liquid to less than 7 when contacted with the first liquid and can transform the first liquid from a region in which the dispersion of the pigment particles is stable to a region in which the dispersion of the pigment particles is unstable.

2. The ink set for inkjet recording of claim 1, wherein the first liquid further contains a dispersing agent.

3. The ink set for inkjet recording of claim 2, wherein the dispersing agent has a weight average molecular weight in the range of from 2,000 to 60,000, and an addition ratio of the dispersing agent with respect to the pigment is in the range of from 10% by mass to 100% by mass.

4. The ink set for inkjet recording of claim 1, wherein the pigment is produced by a build up method.

5. The ink set for inkjet recording of claim 1, wherein the pigment is an encapsulated pigment.

6. The ink set for inkjet recording of claim 1, wherein the first liquid has a pH of 7.5 or more, and the second liquid has a pH of 5 or less.

7. The ink set for inkjet recording of claim 1, wherein at least one of the first liquid is a magenta hue liquid containing a magenta hue pigment as the pigment, and the first liquid further comprises a black hue liquid containing a black hue pigment which has an average particle diameter that is at least 30 nm larger than that of the magenta hue pigment.

8. The ink set for inkjet recording of claim 1, wherein at least one of the first liquid is a cyan hue liquid containing a cyan hue pigment as the pigment, and the first liquid further comprises a black hue liquid containing a black hue pigment which has an average particle diameter that is at least 30 nm larger than that of the cyan hue pigment.

9. The ink set for inkjet recording of claim 1, wherein at least one of the first liquid is a yellow hue liquid containing a yellow hue pigment as the pigment, and the first liquid further comprises a black hue liquid containing a black hue pigment which has an average particle diameter that is at least 30 nm larger than that of the yellow hue pigment.

10. The ink set for inkjet recording of claim 1, wherein at least a black hue liquid, a cyan hue liquid, a magenta hue liquid and a yellow hue liquid are comprised as the first liquid.

11. A method of image recording using an ink set for inkjet recording comprising:
    providing a first liquid containing a water soluble organic solvent, water, and a pigment dispersed therein, in which an average particle diameter of the pigment is from 5 nm to 50 nm and a monodispersity of the pigment is 1.5 or less; and
    providing a second liquid containing a component that can reduce a pH of the first liquid to less than 7 when contacted with the first liquid and can transform the first liquid from a region in which the dispersion of the pigment particles is stable to a region in which the dispersion of the pigment particles is unstable.

12. The method of image recording of claim 11, comprising discharging the first liquid and discharging the second liquid.

13. The method of image recording of claim 12, comprising discharging the first liquid after discharging the second liquid.

* * * * *